(12) United States Patent
Polus

(10) Patent No.: US 11,987,422 B2
(45) Date of Patent: May 21, 2024

(54) CARGO CONTAINERS

(71) Applicant: The Boeing Company, Chicago, IL (US)

(72) Inventor: Jeffrey Edward Polus, Hillsboro, IL (US)

(73) Assignee: The Boeing Company, Arlington, VA (US)

( * ) Notice: Subject to any disclaimer, the term of this patent is extended or adjusted under 35 U.S.C. 154(b) by 556 days.

(21) Appl. No.: 16/408,152

(22) Filed: May 9, 2019

(65) Prior Publication Data

US 2020/0354109 A1   Nov. 12, 2020

(51) Int. Cl.
*B65D 25/22* (2006.01)
*B63B 25/00* (2006.01)
(Continued)

(52) U.S. Cl.
CPC ............ *B65D 25/22* (2013.01); *B63B 25/004* (2013.01); *G05D 1/02* (2013.01); *G06Q 10/08* (2013.01);
(Continued)

(58) Field of Classification Search
CPC .............................................. G06Q 10/08355
See application file for complete search history.

(56) References Cited

U.S. PATENT DOCUMENTS 9,523,986 B1   12/2016 Abebe et al.
9,536,216 B1   1/2017 Lisso
(Continued)

FOREIGN PATENT DOCUMENTS

WO   WO-2019040226 A1 *   2/2019   ........... B64C 39/024

OTHER PUBLICATIONS

Xiao, Yiyong et al.; "Development of a fuel consumption optimization model for the capacitated vehicle routing problem", Published Jul. 2012; Computers & Operations Research; vol. 39, Issue 7; Publication pp. 1419-1431, attachment pp. 1-22; https://www.sciencedirect.com/science/article/pii/S0305 (Year: 2012).*

(Continued)

*Primary Examiner* — Resha Desai
*Assistant Examiner* — Michael C Moroney
(74) *Attorney, Agent, or Firm* — Kolitch Romano Dascenzo Gates LLC

(57) ABSTRACT

Cargo containers are disclosed herein. A cargo container for carrying one or more delivery items to respective delivery destinations may include a container body configured to at least partially enclose and support the delivery item(s) and to be selectively and operatively coupled to a vehicle. The cargo container additionally may include a programmable device supported by the container body that stores manifest information regarding each delivery item. The cargo container further may include a container communication device supported by the container body and configured to convey delivery information to a vehicle communication device of the vehicle to direct the vehicle to the delivery destination(s) of the delivery item(s). The manifest information may include item destination information that represents the delivery destination of each delivery item, and the delivery information may be at least partially based upon the item destination information.

20 Claims, 4 Drawing Sheets

(51) Int. Cl.
*G05D 1/00* (2006.01)
*G06Q 10/08* (2023.01)
*G06Q 10/0835* (2023.01)
*B64C 39/02* (2023.01)
*B64U 101/60* (2023.01)

(52) U.S. Cl.
CPC ...... *G06Q 10/08355* (2013.01); *B64C 39/024* (2013.01); *B64U 2101/60* (2023.01); *B65D 2203/10* (2013.01)

(56) References Cited

U.S. PATENT DOCUMENTS

| | | | |
|---|---|---|---|
| 9,656,805 B1 | 5/2017 | Evans et al. | |
| 9,741,010 B1 | 8/2017 | Heinla | |
| 9,815,633 B1 | 11/2017 | Kisser et al. | |
| 10,647,402 B2 | 5/2020 | High et al. | |
| 10,657,486 B1 | 5/2020 | Wolter et al. | |
| 10,796,268 B2* | 10/2020 | Joao | G06Q 10/08 |
| 10,949,795 B1* | 3/2021 | Kolls | G05D 1/0212 |
| 2003/0136874 A1 | 7/2003 | Gjerdrum | |
| 2012/0136759 A1* | 5/2012 | Roslak | G06Q 10/087 705/28 |
| 2015/0120094 A1 | 4/2015 | Kimchi et al. | |
| 2015/0324738 A1* | 11/2015 | Moreno | G06Q 10/087 235/385 |
| 2016/0047646 A1 | 2/2016 | Ochsendorf et al. | |
| 2016/0196525 A1* | 7/2016 | Kantor | G08G 5/0013 705/330 |
| 2016/0207627 A1* | 7/2016 | Hoareau | B64D 1/12 |
| 2016/0239802 A1* | 8/2016 | Burch, V et al. | G06Q 10/0833 |
| 2017/0129603 A1 | 5/2017 | Raptopoulus et al. | |
| 2017/0178072 A1 | 6/2017 | Poornachandran et al. | |
| 2017/0221017 A1* | 8/2017 | Gonen | G06Q 10/1097 |
| 2017/0300855 A1* | 10/2017 | Lund | B64C 39/024 |
| 2017/0357919 A1* | 12/2017 | Bischoff | B07C 3/08 |
| 2018/0009549 A1 | 1/2018 | Sullivan et al. | |
| 2018/0072415 A1 | 3/2018 | Cantrell et al. | |
| 2018/0072420 A1* | 3/2018 | Prager | B64D 17/383 |
| 2018/0096175 A1* | 4/2018 | Schmeling | G06Q 10/08 |
| 2018/0158022 A1 | 6/2018 | Fu et al. | |
| 2018/0356823 A1 | 12/2018 | Cooper | |
| 2019/0066038 A1* | 2/2019 | O'Brien | B65G 67/24 |
| 2019/0102730 A1 | 4/2019 | Giorgi et al. | |
| 2019/0114564 A1 | 4/2019 | Ferguson et al. | |
| 2019/0161190 A1* | 5/2019 | Gil | G01S 19/15 |
| 2019/0180237 A1 | 6/2019 | Mattingly et al. | |
| 2019/0197643 A1 | 6/2019 | Cochran et al. | |
| 2019/0197646 A1 | 6/2019 | Prager et al. | |
| 2019/0205966 A1* | 7/2019 | Igata | G05D 1/0212 |
| 2019/0220819 A1 | 7/2019 | Banvait et al. | |
| 2019/0295036 A1 | 9/2019 | Fan | |
| 2019/0300259 A1* | 10/2019 | Ruth | B65D 55/14 |
| 2019/0359329 A1 | 11/2019 | Gavrilov | |
| 2020/0242548 A1 | 7/2020 | Curry et al. | |
| 2020/0341467 A1* | 10/2020 | Glendenning | G08G 1/096833 |

OTHER PUBLICATIONS

Various; "Are UPS drivers more likely to deliver larger packages first? Are they more likely to actually get delivered once on the truck for the day rather than go back to dispatch?"; cited portions published Dec. 23, 2018; Quora; pp. 1-3; (Year: 2018).*

Wood Crate—36 × 36 × 36; Accessed as of Jul. 23, 2016; ULINE; p. 1; https://www.uline.com/Product/Detail/S-13373/Wood-Crates/Wood-Crate-36-x-36-x-36 (Year: 2016).*

Darling et. al., "Vehicle Routing Problems for Drone Delivery," Jan. 1, 2017, IEEE, *IEEE Transactions On Systems, Man, And Cybernetics: Systems*, vol. 47, No. 1.

Jeong et. al., "Truck-Drone Hybrid Delivery Routing: Payload-Energy Dependency And No-Fly Zones," Jan. 8, 2019, Elsevier, *International Journal of Production Economics* 214 (2019) 220--233.

Youtube.com—Robodub, "Drone Delivery for Multiple Packages," https://youtube.com/watch?v=io_RNdKizos, published Sep. 11, 2018.

Canada Intellectual Property Office, Office action report in CA Patent Application No. 3073620, dated Feb. 13, 2023.

* cited by examiner

CARGO CONTAINERS

FIELD

The present disclosure relates to cargo containers for carrying delivery items.

BACKGROUND

Owing to advances in automated aerial vehicle technology, transporting delivery items autonomously via unmanned aerial vehicles (UAVs) is increasingly practical. However, coordinating delivery of a plurality of delivery items utilizing a plurality of UAVs may introduce logistical challenges. For example, in a logistics operation that includes a plurality of UAVs each configured to carry one of a plurality of cargo containers, the ability to pair a given cargo container to a given UAV may be constrained by a predetermined configuration of the UAV and/or by a need to provide the UAV with delivery instructions corresponding to the cargo container. Accounting for a variable payload of delivery items contained within a given cargo container serves to compound such challenges.

SUMMARY

Cargo containers are disclosed herein. A cargo container for carrying one or more delivery items to respective delivery destinations may include a container body configured to at least partially enclose and support the delivery item(s) and to be selectively and operatively coupled to a vehicle. The cargo container additionally may include a programmable device supported by the container body that stores manifest information regarding each delivery item. The cargo container further may include a container communication device supported by the container body and configured to convey delivery information to a vehicle communication device of the vehicle to direct the vehicle to the delivery destination(s) of the delivery item(s). The manifest information may include item destination information that represents the delivery destination of each delivery item, and the delivery information may be at least partially based upon the item destination information.

DESCRIPTION

Figure 1:
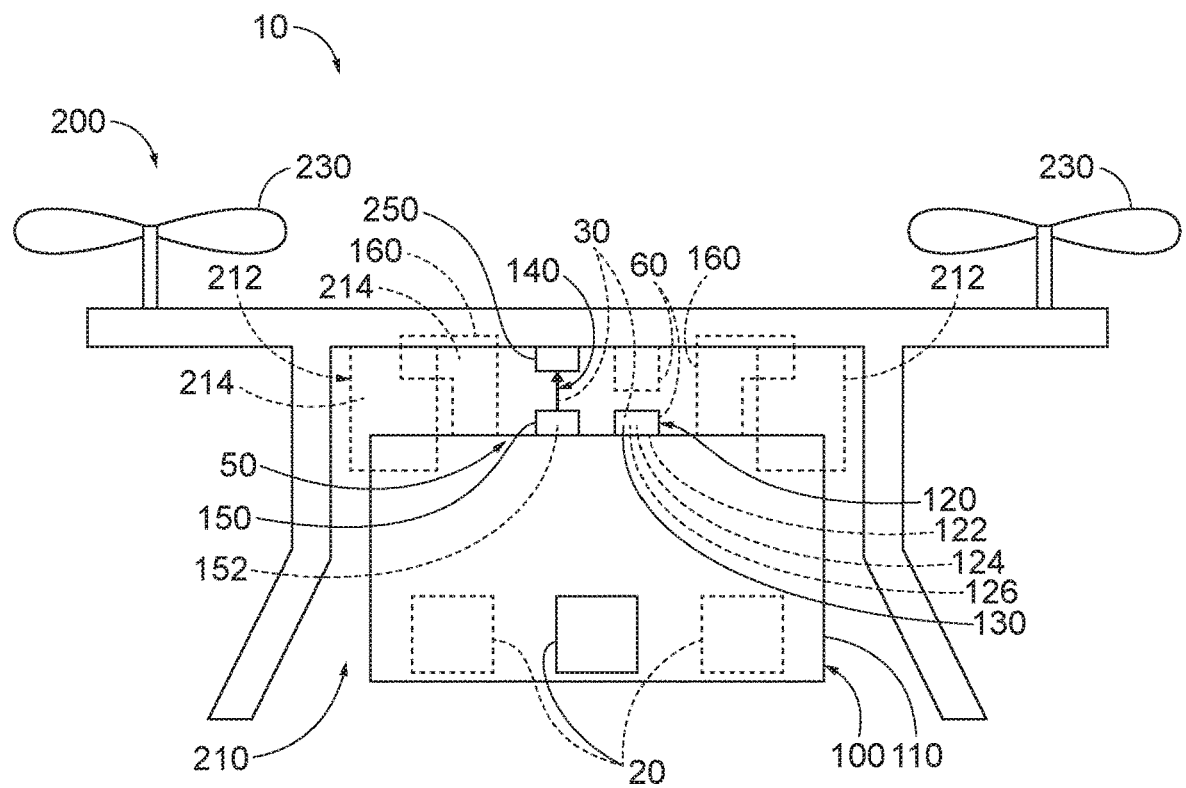
FIG. 1 is a schematic side elevation view representing examples of cargo aerial delivery systems according to the present disclosure.

FIGS. 1-6 provide illustrative, non-exclusive examples of cargo aerial delivery systems 10 for delivering one or more delivery items 20 to respective delivery destinations 22 and/or of cargo container 100 for carrying one or more delivery items 20, according to the present disclosure. Elements that serve a similar, or at least substantially similar, purpose are labeled with like numbers in each of FIGS. 1-6, and these elements may not be discussed in detail herein with reference to each of FIGS. 1-6. Similarly, all elements may not be labeled in each of FIGS. 1-6, but reference numerals associated therewith may be utilized herein for consistency. Elements, components, and/or features that are discussed herein with reference to one or more of FIGS. 1-6 may be included in and/or utilized with any of FIGS. 1-6 without departing from the scope of the present disclosure. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a given example without departing from the scope of the present disclosure.

FIG. 1 schematically illustrates examples of cargo aerial delivery systems 10 and of cargo containers 100 according to the present disclosure. As schematically illustrated in FIG. 1, a cargo aerial delivery system 10 includes a cargo container 100 configured to carry one or more delivery items 20 and a vehicle 200 configured to carry cargo container 100 to each of one or more delivery destinations 22 corresponding to delivery item(s) 20. Each delivery item 20 is associated with a corresponding delivery destination 22, such that cargo container 100 and/or cargo aerial delivery system 10 is configured to transport each delivery item 20 to the corresponding delivery destination 22. Cargo aerial delivery system 10 is configured to receive information for the delivery destination 22 for each delivery item 20 via local communication with a secured cargo container 100, such that cargo aerial delivery system 10 receives destinations for transport of delivery items 20 independent of any communication from an external remotely-located communication network.

Cargo container 100 may be configured to support and/or carry delivery item(s) 20 in any appropriate manner. For example, and as schematically illustrated in FIG. 1, cargo container 100 may include a container body 110 configured to at least partially enclose and support delivery item(s) 20 and configured to be selectively and operatively coupled to vehicle 200.

Vehicle 200 may include and/or be any appropriate vehicle, such as an unmanned aerial vehicle (UAV) 200. It is within the scope of the present disclosure that cargo container 100 may be configured to be utilized in conjunction with any appropriate vehicle 200, and/or that elements and/or aspects of cargo aerial delivery systems 10 according to the present disclosure may be employed in systems that utilize vehicles 200 other than UAVs, such as land-, water-, and/or space-based vehicles. However, without loss of generality, the present disclosure generally is directed to examples in which vehicle 200 is a UAV. Accordingly, references herein to UAV 200 also may be understood as describing a vehicle 200, as appropriate, and vice versa.

In general, and as discussed herein, cargo aerial delivery system 10 is configured such that UAV 200 travels to and/or is guided to each delivery destination 22 independent of or without UAV 200 receiving delivery instructions from an external remotely-located communication network (such as a communication network external to UAV 200 and/or cargo container 100). Instead, and as described herein, cargo container 100 is configured to provide information about delivery items 20 and delivery destinations 22 to UAV 200 to enable and/or direct UAV 200 to travel to each delivery destination 22. In this manner, cargo container 100 may be configured to be carried by any of a plurality of unique UAVs 200 that are configured to engage cargo container 100. Cargo aerial delivery system 10 maybe configured such that a given cargo container 100 containing delivery item(s) 20 may be operatively coupled to and carried by any available UAV 200 of a fleet of UAVs 200 for transport of delivery items 20 to their destinations without UAV 200 receiving delivery instructions regarding delivery item(s) 20 other than from cargo container 100.

As additionally schematically illustrated in FIG. 1, cargo container 100 includes a programmable device 120 that stores manifest information 130 regarding each delivery item 20. As described in more detail herein, cargo aerial delivery system 10 generally is configured such that UAV 200 travels to and/or is guided to each delivery destination 22 based, at least in part, on manifest information 130 (and/or on information and/or instructions that are derived from manifest information 130). Manifest information 130 may include and/or be any appropriate information characterizing delivery item(s) 20 carried by cargo container 100. For example, manifest information 130 generally includes an item identifier and item destination information that represents delivery destination 22 of each delivery item 20. As additional examples, manifest information 130 may include item weight information that represents a weight of each delivery item 20 for each delivery destination 22; item identification information that represents an identity of each delivery item 20; item recipient information that represents an intended recipient of each delivery item 20; hazardous material information that represents a hazardousness associated with each delivery item 20 (such as may correspond to a safety data sheet (SDS) associated with each delivery item 20); and/or time sensitivity information that represents a latest arrival time by which each delivery item 20 needs to reach its respective delivery destination 22. However, such examples are not exhaustive, and it is additionally within the scope of the present disclosure that manifest information 130 may include any appropriate additional and/or alternative descriptors corresponding to delivery item(s) 20.

Cargo aerial delivery system 10, cargo container 100, and/or programmable device 120 may be configured to selectively receive, enter, and/or update manifest information 130 in any appropriate manner. For example, and as schematically illustrated in FIG. 1, cargo container 100 may include an input device 122 configured to enable selectively updating manifest information 130 when a given delivery item 20 is added to or removed from cargo container 100. Input device 122 may be configured to update manifest information 130 in any appropriate manner, such as at least partially automatically and/or at least partially manually. As an example, and as schematically illustrated in FIG. 1, input device 122 may include an input scanner 124 configured to scan a portion of delivery item 20 when delivery item 20 is added to or removed from cargo container 100, such as via an optical, electrical, and/or magnetic means. In such examples, input scanner 124 may be manually operated, and/or may be configured to automatically scan delivery item 20 as delivery item 20 is added to or removed from cargo container 100. Additionally or alternatively, input device 122 may be configured to receive a manual input to update manifest information 130, such as via a user interface 126 configured to receive an input from a human user to update manifest information 130. In such examples, user interface 126 may include and/or be any appropriate interface, such as a keyboard, a touchscreen, and/or a voice-activated control.

As schematically illustrated in FIG. 1, cargo aerial delivery system 10 generally includes a delivery system controller 60 configured to determine and generate an order of delivery, a destination schedule, and/or a delivery itinerary 30 for UAV 200 to travel along to deliver delivery item(s) 20. For example, when cargo container 100 carries two or more delivery items 20, delivery itinerary 30 may include and/or be an ordered and/or sequential list of delivery destinations 22 corresponding to the two or more delivery items 20. In such examples, delivery itinerary 30 may include and/or be information regarding a delivery sequence in which delivery items 20 are to be delivered to the respective delivery destinations 22. Additionally or alternatively, delivery itinerary 30 may include information regarding a specific route for UAV 200 to follow, such as speed, altitude, and/or flight path information to direct UAV 200 to delivery destination(s) 22. Delivery itinerary 30 generally is at least partially based on manifest information 130, as described herein.

Delivery system controller 60 may be a component of and/or supported by any appropriate component of cargo aerial delivery system 10. As examples, and as schematically illustrated in FIG. 1, cargo container 100 and/or UAV 200 may include delivery system controller 60. In an example in which cargo container 100 includes delivery system controller 60, programmable device 120 may be associated with delivery system controller 60. In such examples, programmable device 120 also may be described as generating delivery itinerary 30.

Delivery system controller 60 and/or programmable device 120 may be any suitable device or devices that are configured to perform the functions of delivery system controller 60 and/or of programmable device 120 discussed herein. For example, the delivery system controller 60 may include one or more of an electronic controller, a dedicated controller, a special-purpose controller, an unmanned aerial vehicle navigation controller, a personal computer, a special-purpose computer, or other suitable controller device. The programmable device 120 may include an RFID device, a display device, a logic device, a memory device, and/or a memory device having non-transitory computer readable media suitable for storing computer-executable instructions for implementing aspects of systems and/or methods according to the present disclosure.

As discussed, when cargo container 100 carries two or more delivery items 20, delivery itinerary 30 generally includes information regarding an order and/or sequence in which the delivery items 20 are to be delivered to the corresponding delivery destinations 22, which is at least partially based upon manifest information 130 associated with delivery items 20. In one example, the delivery sequence is arranged such that delivery of a given delivery item 20 is at least partially prioritized when the given delivery item 20 has the same delivery destination 22 and/or the same intended recipient as one or more other delivery items. Arranging the delivery sequence in this manner facilitates reducing a total weight of delivery items 20 remaining in cargo container 100 relatively early in delivery itinerary 30, such as to optimize an energy efficiency of UAV 200. UAV 200 may operate with a higher energy efficiency when carrying a smaller total weight, such that removing weight from cargo container 100 earlier in delivery itinerary 30 facilitates operating UAV 200 with a higher energy efficiency for a greater remainder of delivery itinerary 30.

Accordingly, delivery itinerary 30 additionally or alternatively may be configured to at least partially prioritize delivering heavier delivery items 20 before delivering lighter delivery items 20. For example, manifest information 130 may include the weight information regarding each delivery item 20, and delivery itinerary 30 may be at least partially based upon the weight information of delivery items 20 for each delivery destination 22. In such examples, the delivery sequence may be arranged at least in part to prioritize delivering in order of decreasing weight of delivery items 20 for each delivery destination 22. As additional examples, the delivery sequence may be arranged at least in part to prioritize delivering delivery items 20 in order of decreasing hazardousness (such as may be represented by the hazardous material information corresponding to each delivery item 20) and/or in order of increasing latest arrival times and/or decreasing time sensitivity (such as may be represented by the time sensitivity information corresponding to each delivery item 20).

Delivery system controller 60 also may be configured to generate delivery itinerary 30 based on any appropriate considerations, such as to reduce and/or minimize a total travel time required to deliver delivery items 20, and/or to reduce and/or minimize a total amount of energy required to deliver delivery items 20. As an example, delivery itinerary 30 may be at least partially based on the item destination information. As a more specific example, the delivery sequence may be arranged at least in part to prioritize delivering delivery items 20 in order of increasing distance from UAV 200 (e.g., relative to an initial position of UAV 200). Arranging the delivery sequence in this manner may correspond to a reduction in a total distance travelled by UAV 200 while following delivery itinerary 30.

With continued reference to FIG. 1, cargo aerial delivery system 10 utilizes a local communication mode 50 configured to convey delivery information 140 from cargo container 100 to UAV 200. As discussed, local communication mode 50 generally is configured to convey delivery information 140 from cargo container 100 to UAV 200 independent of communications with an external remotely-located communication network. In this manner, local communication mode 50 enables UAV 200 to transport delivery items 20 according to delivery itinerary 30 having received delivery itinerary 30, or having generated delivery itinerary 30 upon receipt of delivery information 140, only from cargo container 100.

As used herein, delivery information 140 generally refers to a set of information that is transferred from cargo container 100 to UAV 200, and generally is at least partially based on manifest information 130. That is, delivery information 140 may include, be, and/or be based on at least a portion of manifest information 130. In some examples, delivery information 140 may include and/or be delivery itinerary 30, such as in an example in which cargo container 100 includes delivery system controller 60. That is, in such an example, delivery system controller 60 may be configured to generate delivery itinerary 30 at least partially based on manifest information 130, such that delivery itinerary 30 is transferred from cargo container 100 to UAV 200 via local communication mode 50. However, this is not required of all examples of cargo aerial delivery system 10, and it additionally is within the scope of the present disclosure that delivery itinerary 30 may be generated subsequent to conveying delivery information 140 via local communication mode 50 from cargo container 100 to UAV 200. As an example, in an example in which UAV 200 includes delivery system controller 60, delivery system controller 60 may be configured to generate delivery itinerary 30 based on delivery information 140 and subsequent to conveying delivery information 140 via local communication mode 50 from cargo container 100 to UAV 200.

Local communication mode 50 may include and/or be any appropriate system for conveying delivery information 140 from cargo container 100 to UAV 200. As an example, and as schematically illustrated in FIG. 1, cargo container 100 may include a container communication device 150 (such as may be supported by container body 110) and UAV 200 may include a vehicle communication device 250 where the local communication mode 50 is utilized by the container communication device 150 and vehicle communication device 250. In such examples, the local communication mode 50 generally is utilized to convey delivery information 140 from container communication device 150 to vehicle communication device 250. Examples of a local communication mode 50 may include near-field communication, Bluetooth communication, RF communication and/or an RFID reader, a bar code scanner or other code scanner, or other suitable modes of local communication, where information may be conveyed via an electromagnetic signal, an electrical signal, an optical signal, a radio frequency signal, a near-field communication signal, a wireless connection, a wired connection, a direct connection, and/or a visual connection. In such examples, communication of delivery information 140 from container communication device 150 to vehicle communication device 250 may be initiated in any appropriate manner. As examples, container communication device 150 may be configured to initiate communication of delivery information 140 to vehicle communication device 250, or may be configured to convey delivery information 140 to vehicle communication device 250 responsive to receiving a request for delivery information 140 from vehicle communication device 250.

Delivery information 140 may be conveyed from container communication device 150 to vehicle communication device 250 in any appropriate manner and/or in any appropriate form, such as via an electromagnetic signal, an electrical signal, an optical signal, a radio frequency signal, a near-field communication signal, a wireless connection, a wired connection, a direct connection, and/or a visual connection. As an example, container communication device 150 may be configured to complete an electrical connection with vehicle communication device 250 when container body 110 is operatively coupled to UAV 200. Additionally or alternatively, container communication device 150 may be configured to actively transmit delivery information 140 to vehicle communication device 250. For example, and as schematically illustrated in FIG. 1, container communication device 150 may include a wireless transmitter 152 configured to wirelessly transmit delivery information 140 to vehicle communication device 250. In other examples, container communication device 150 may be configured to passively provide delivery information 140 to vehicle communication device 250. As more specific examples of such passive communication, container communication device 150 may include and/or be a barcode, a matrix barcode, a magnetic stripe, a radio frequency identification (RFID) tag, and/or a near-field communication (NFC) tag, and vehicle communication device 250 may be configured to read, scan, and/or otherwise receive delivery information 140 from container communication device 150.

UAV 200 may be configured to receive and/or engage cargo container 100 in any appropriate manner. For example, and as schematically illustrated in FIG. 1, UAV 200 may include a docking bay 210 such that cargo container 100 is at least partially received within docking bay 210 when cargo container 100 is operatively coupled to UAV 200. In such examples, docking bay 210 may refer to a portion of UAV 200 that is at least partially enclosed, such as to at least partially encapsulate cargo container 100. However, this is not required of all examples, and it additionally is within the scope of the present disclosure that docking bay 210 may refer to a portion of UAV 200 that is at least partially exposed to an exterior environment. Additionally or alternatively, UAV 200 may include a cargo container receiver 212 configured to selectively and operatively engage cargo container 100 such that cargo container 100 is secured to UAV 200 and such that UAV 200 may carry cargo container 100. In such examples, cargo container 100 may be described as including a vehicle engagement structure 160 configured to selectively and operatively engage cargo container receiver 212 to operatively secure cargo container 100 to UAV 200. Equivalently, cargo container receiver 212 may be described as being configured to selectively and operatively engage vehicle engagement structure 160 to operatively secure cargo container 100 to UAV 200. In this manner, one or both of vehicle engagement structure 160 and cargo container receiver 212 may include a structure that is mechanically actuated, examples of which may include a latch, a hook, a clamp, a cradle, etc. Additionally or alternatively, vehicle engagement structure 160 may refer to a substantially static portion of cargo container 100 that is engaged by cargo container receiver 212, and/or cargo container receiver 212 may refer to a substantially static portion of UAV 200 that is engaged by vehicle engagement structure 160. In such examples, cargo container 100 may be described as being configured to be selectively transitioned between a docked configuration, in which cargo container receiver 212 operatively engages cargo container 100 and/or vehicle engagement structure 160 such that UAV 200 may carry cargo container 100, and an undocked configuration, in which cargo container 100 is removed from UAV 200.

Vehicle engagement structure 160 and/or cargo container receiver 212 may include and/or be any appropriate portions of cargo container 100 and/or UAV 200. As examples, vehicle engagement structure 160 may include a structure that extends from container body 110 to meet UAV 200 and/or cargo container receiver 212, or may simply be a portion of cargo container 100 and/or of container body 110 that engages (and/or that is engaged by) cargo container receiver 212. Similarly, cargo container receiver 212 may include a structure that extends within docking bay 210 to meet cargo container 100 and/or vehicle engagement structure 160, or may simply be a portion of UAV 200 and/or of docking bay 210 that engages (and/or that is engaged by) vehicle engagement structure 160.

Vehicle engagement structure 160 and/or cargo container receiver 212 may be at least partially load-bearing, and/or may be configured such that engagement between vehicle engagement structure 160 and cargo container receiver 212 is at least partially load-bearing. Vehicle engagement structure 160 and/or cargo container receiver 212 may be configured to at least partially restrict cargo container 100 from transitioning from the docked configuration to the undocked configuration, and/or may be configured to at least partially support a weight of cargo container 100. That is, vehicle engagement structure 160 and/or cargo container receiver 212 may be configured such that cargo container receiver 212 at least partially supports the weight of cargo container 100 when vehicle engagement structure 160 operatively engages cargo container receiver 212 and/or when UAV 200 carries cargo container 100. Additionally or alternatively, vehicle engagement structure 160 and/or cargo container receiver 212 may be configured such that cargo container 100 and/or vehicle engagement structure 160 at least partially supports a weight of UAV 200 when vehicle engagement structure 160 operatively engages cargo container receiver 212. For example, cargo container 100 may be configured to contact a ground surface when UAV 200 is not in flight and when cargo container 100 is operatively secured to UAV 200 such that cargo container 100 supports UAV 200, such as to support UAV 200 above the ground surface. In such examples, cargo container 100 may include a landing gear, a landing skid, a ground-contacting surface, and/or any other appropriate component for engaging the ground surface. In examples in which vehicle engagement structure 160 and/or cargo container receiver 212 is at least partially load-bearing, vehicle engagement structure 160 and/or cargo container receiver 212 also may be described as representing a detachable load-bearing structure.

Vehicle engagement structure 160 and/or cargo container receiver 212 additionally or alternatively may be configured such that cargo container 100 is restricted from transitioning from the undocked configuration to the docked configuration unless vehicle engagement structure 160 and cargo container receiver 212 are aligned and/or otherwise in a predetermined orientation relative to one another. In such examples, vehicle engagement structure 160 and/or cargo container receiver 212 may be described as being keyed. In some examples, vehicle engagement structure 160 may include container communication device 150, such as to permit an electrical connection between container communication device 150 and vehicle communication device 250 when container body 110 is operatively coupled to UAV 200.

When present, vehicle engagement structure 160 generally is configured to selectively and operatively engage cargo container receiver 212 to secure cargo container 100 to UAV 200 when cargo container 100 and/or container body 110 is operatively coupled to UAV 200. For example, vehicle engagement structure 160 may be configured to mechanically engage container body 110 and/or cargo container receiver 212 such that cargo container 100 is at least partially restricted from moving relative to UAV 200 when cargo container 100 and/or container body 110 is operatively coupled to UAV 200 and when UAV 200 carries cargo container 100. To ensure and/or facilitate operative coupling between vehicle engagement structure 160 and cargo container receiver 212, vehicle engagement structure 160 may be configured to operatively engage cargo container receiver 212 only when container body 110 is in a predetermined orientation relative to UAV 200 and/or docking bay 210.

Cargo container 100 and/or UAV 200 may include one or more components configured to detect when container body 110 is operatively coupled to UAV 200. For example, and as schematically illustrated in FIG. 1, cargo container 100 and/or UAV 200 may include a cargo container engagement sensor 214 configured to detect when container body 110 is operatively coupled to UAV 200 and/or when cargo container 100 is in the docked configuration. Cargo container engagement sensor 214 may include and/or be any appropriate mechanism, and may be a component of any appropriate portion of cargo aerial delivery system 10. As examples, cargo container 100, vehicle engagement structure 160, UAV 200, and/or cargo container receiver 212 may include cargo container engagement sensor 214.

In examples of cargo aerial delivery system 10 that include cargo container engagement sensor 214, local communication mode 50 may be utilized to convey delivery information 140 from cargo container 100 to UAV 200 based, at least in part, on cargo container engagement sensor 214 indicating that container body 110 is operatively coupled to UAV 200. For example, container communication device 150 may be configured to convey delivery information 140 to vehicle communication device 250 responsive to cargo container engagement sensor 214 indicating that container body 110 is operatively coupled to UAV 200. Local communication system 50 may be configured to initiate a transfer of delivery information 140 from container communication device 150 to vehicle communication device 250 responsive to cargo container engagement sensor 214 indicating that cargo container 100 is in the docked configuration. Additionally or alternatively, delivery system controller 60 and/or programmable device 120 may be configured to generate delivery itinerary 30, and/or to convey delivery itinerary 30 and/or delivery information 140 to UAV 200, responsive to cargo container engagement sensor 214 indicating that vehicle engagement structure 160 operatively engages cargo container receiver 212.

As discussed, as used herein, UAV 200 represents an exemplary, non-exclusive embodiment of vehicle 200 for carrying cargo container 100. In such examples, UAV 200 may be any appropriate aerial vehicle for carrying cargo container 100. For example, and as schematically illustrated in FIG. 1, UAV 200 may be a rotorcraft that includes one or more rotors 230. As more specific examples, UAV 200 may include one rotor 230, two rotors 230, three rotors 230, four rotors 230, or more than four rotors 230. In such examples, rotor(s) 230 may be at least partially battery-powered. Accordingly, in contrast to an example of vehicle 200 that consumes a fuel while traveling, UAV 200 in the form of a battery-powered rotorcraft may experience a decrease in total carried weight only upon unloading delivery items 20 at respective delivery destinations 22. In this manner, configuring delivery itinerary 30 to prioritize delivering delivery items 20 in order of decreasing weight may be particularly advantageous in examples in which UAV 200 is battery-powered.

Cargo container 100 may have any appropriate specifications and/or dimensions for carrying delivery item(s) 20. As examples, container body 110 of cargo container 100 may define a volume that has a capacity that is at least 10 liters (L), at least 50 L, at least 100 L, at least 500 L, at least 1,000 L, at least 5,000 L, at least 10,000 L, at least 50,000 L, at most 100,000 L, at most 70,000 L, at most 20,000 L, at most 7,000 L, at most 2,000 L, at most 700 L, at most 200 L, at most 70 L, and/or at most 20 L. Additionally or alternatively, cargo container 100 and delivery item(s) contained therein collectively may have a total mass that is at least 1 kilogram (kg), at least 5 kg, at least 10 kg, at least 50 kg, at least 100 kg, at least 500 kg, at least 1,000 kg, at most 1,500 kg, at most 700 kg, at most 200 kg, at most 70 kg, at most 20 kg, at most 7 kg, and/or at most 2 kg.

Figure 2:
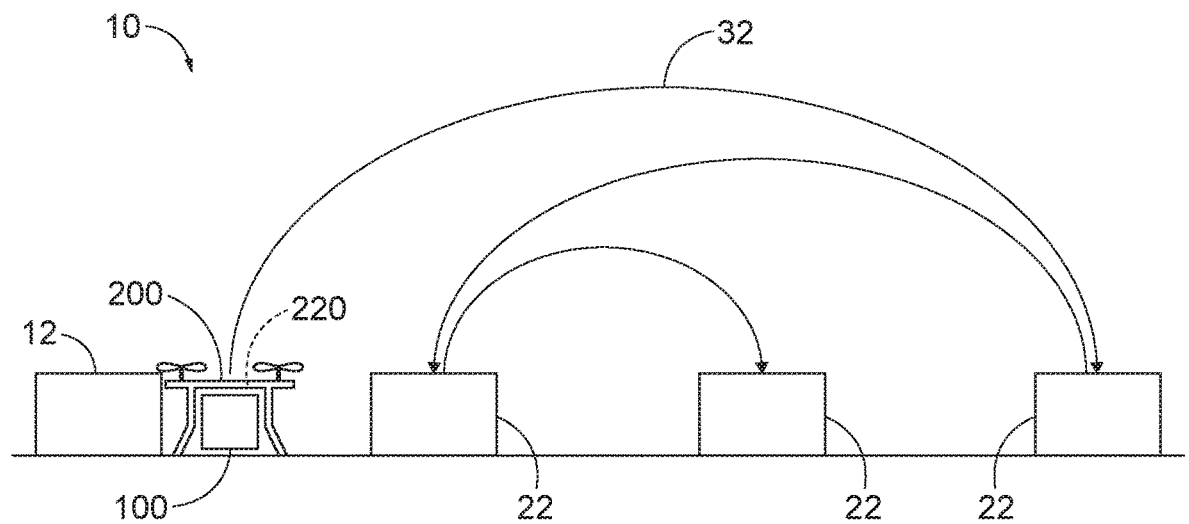
FIG. 2 is a schematic diagram representing an example of utilizing cargo aerial delivery systems according to the present disclosure.

FIG. 2 schematically illustrates an example of a delivery route 32 that may be followed by UAV 200, such as may correspond to delivery itinerary 30. Delivery route 32 may correspond to and/or be a spatial and/or temporal path followed by UAV 200 as UAV 200 follows and/or proceeds according to delivery itinerary 30, and/or may include and/or be a sequence of delivery destinations 22 specified by delivery itinerary 30. As used herein, delivery itinerary 30 generally refers to a set of information and/or instructions corresponding to a route to be followed by UAV 200, while delivery route 32 generally refers to the route itself (as expressed in any appropriate manner). In particular, FIG. 2 schematically illustrates an example of delivery route 32 that is based upon delivery itinerary 30 in which the delivery sequence is at least partially based upon a consideration other than distance between UAV 200 and delivery destination 22. As further schematically illustrated in FIG. 2, cargo aerial delivery system 10 additionally may include a ground-based control system 12 configured to monitor UAV 200 as UAV 200 travels along delivery route 32. In such examples, and as schematically illustrated in FIGS. 1-2, UAV 200 additionally may include a ground communication device 220 configured to communicate with ground-based control system 12. In this manner, ground-based control system 12 may be configured to monitor a location of UAV 200 and/or a delivery status of delivery item(s) carried by UAV 200 as UAV 200 travels along delivery route 32. As discussed, ground-based control system 12 generally is not configured to provide UAV 200 with manifest information 130, delivery information 140, or delivery itinerary 30 prior to UAV 200 embarking upon delivery route 32. As discussed herein, ground-based control system 12 does not include and/or represent an external remotely located communication network that conveys delivery information 140 to UAV 200.

Figure 3:
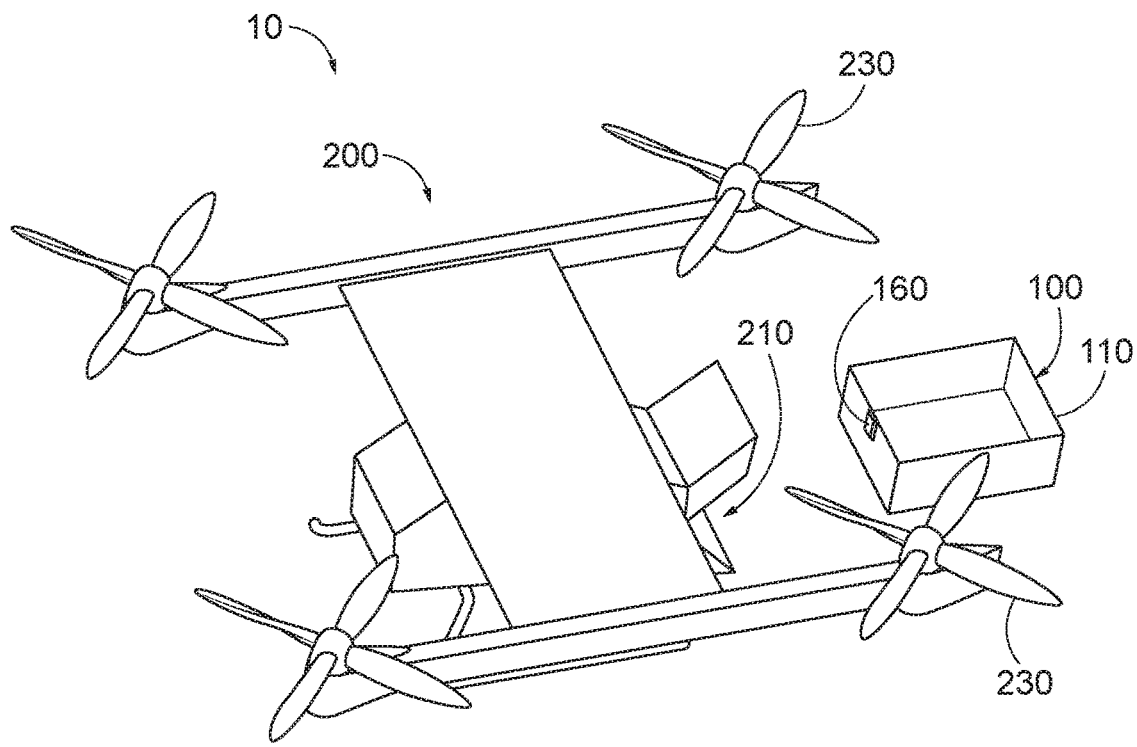
FIG. 3 is a top side isometric view representing an example of a cargo aerial delivery system with a cargo container positioned outside of an unmanned aerial vehicle (UAV) according to the present disclosure.
Figure 4:
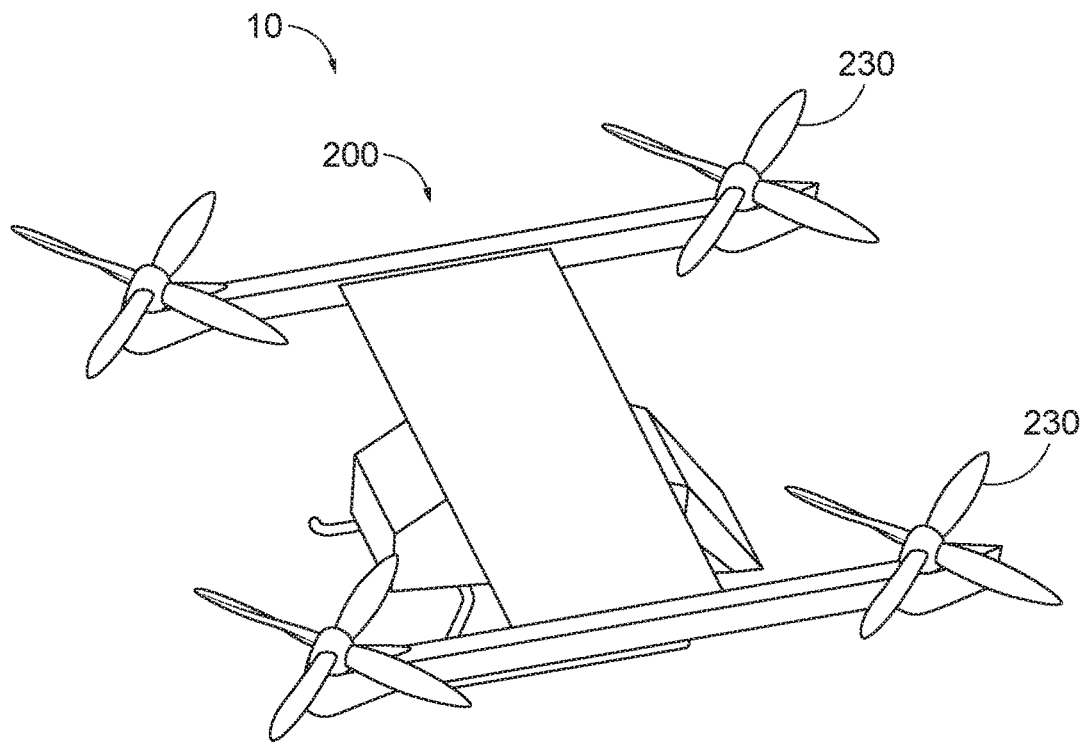
FIG. 4 is a top side isometric view representing the cargo aerial delivery system of FIG. 3 with the cargo container received within the UAV.
Figure 5:
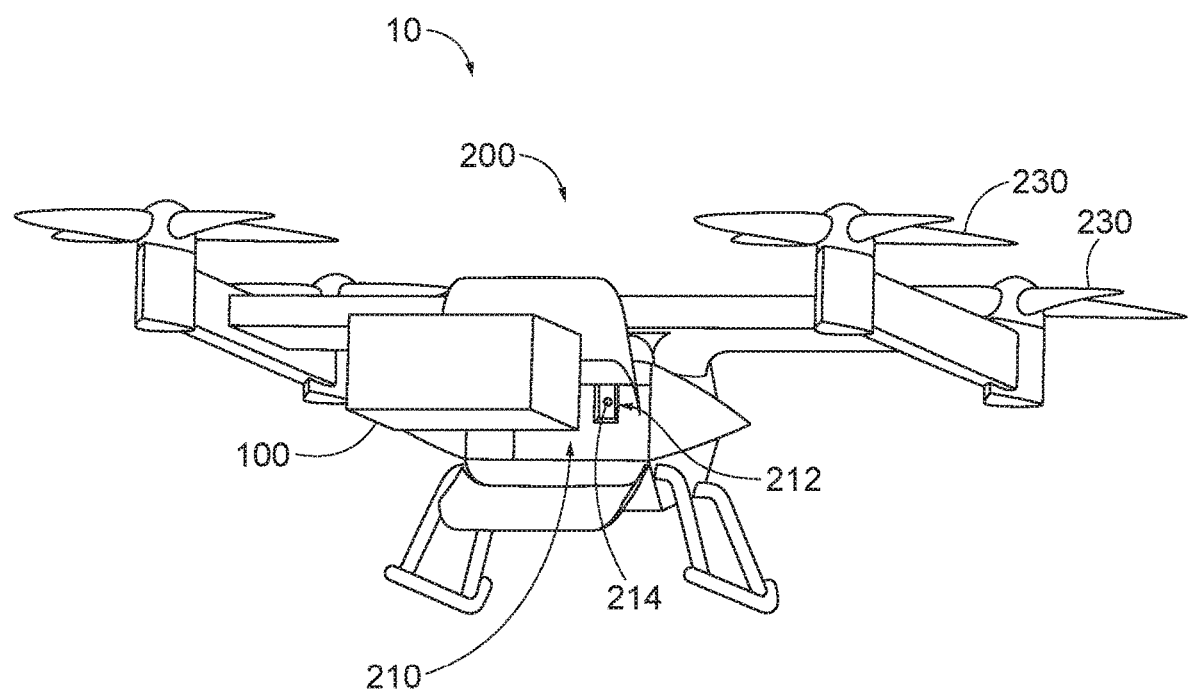
FIG. 5 is bottom rear isometric view representing the cargo aerial delivery system of FIGS. 3-4 with the cargo container positioned outside of the UAV.

FIGS. 3-5 provide less schematic illustrations of a portion of an example of cargo aerial delivery system 10. More specifically, FIGS. 3-5 illustrate an example of cargo aerial delivery system 10 in which UAV 200 is a rotorcraft with four rotors 230 and in which cargo container 100 is fully contained within docking bay 210 of UAV 200 when in the docked configuration. FIGS. 3 and 5 illustrate examples in which cargo container 100 is removed from UAV 200 (and hence is in the undocked configuration), while FIG. 4 illustrates an example in which cargo container 100 is operatively received within (and fully enclosed within) docking bay 210, such that cargo container 100 is concealed from view. As seen in FIGS. 3 and 5, FIGS. 3-5 illustrate an example in which cargo container 100 includes vehicle engagement structure 160 (shown in FIG. 3) and in which UAV 200 includes cargo container receiver 212 such that vehicle engagement structure 160 and cargo container receiver 212 engage one another when cargo container 100 is in the docked configuration. Additionally, in the example of FIGS. 3-5, cargo container receiver 212 includes cargo container engagement sensor 214 (as seen in FIG. 5).

Figure 6:
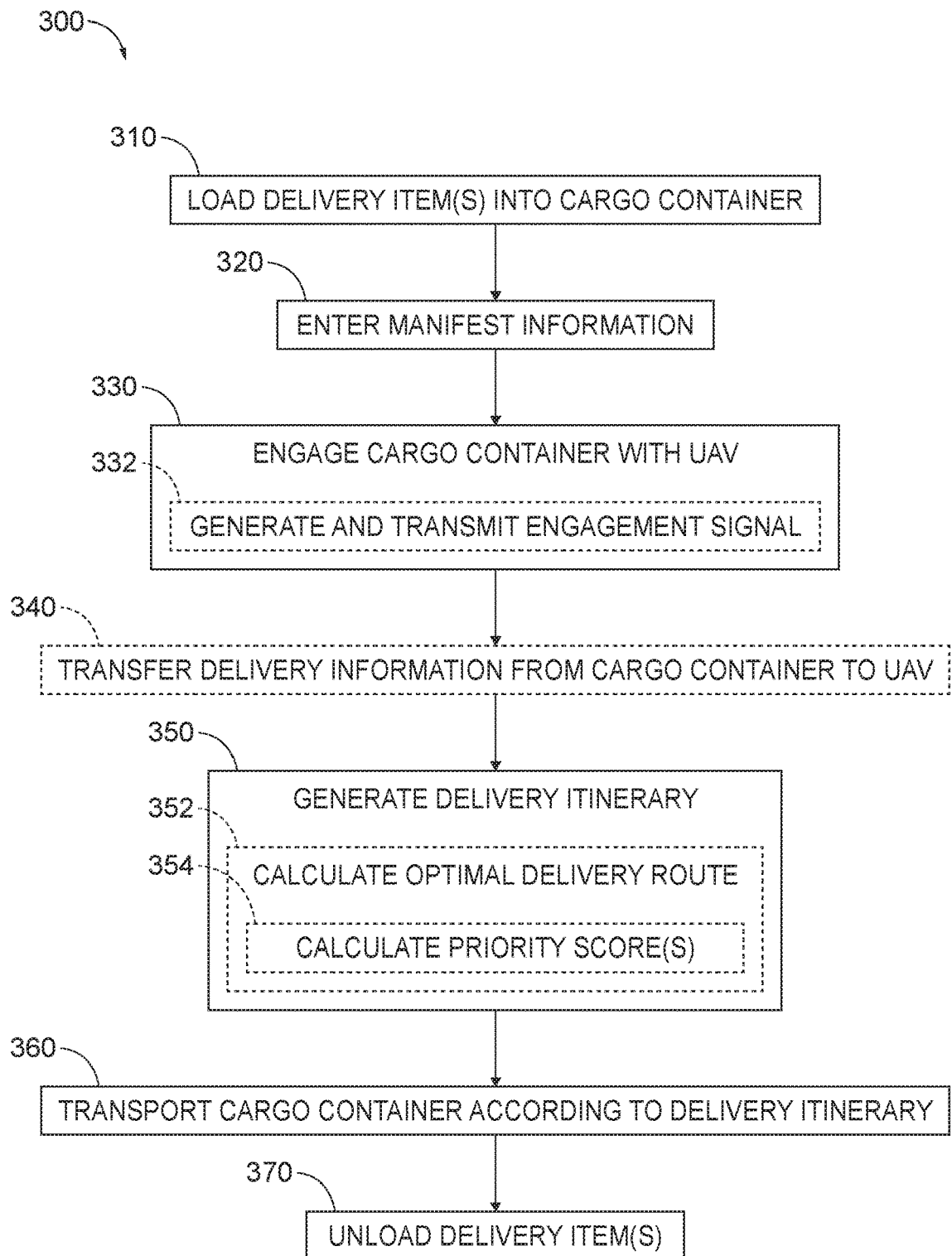
FIG. 6 is a flowchart schematically representing methods of utilizing cargo aerial delivery systems according to the present disclosure.

FIG. 6 is a flowchart schematically depicting methods 300, according to the present disclosure, of utilizing a cargo aerial delivery system (such as cargo aerial delivery system 10) that includes a cargo container (such as cargo container 100) and a UAV (such as UAV 200) to deliver one or more delivery items (such as delivery items 20) to respective delivery destinations (such as delivery destinations 22). In FIG. 6, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 6 are not limiting and other methods and steps are within the scope of the present disclosure, including methods having greater than or fewer than the number of steps illustrated, as understood from the discussions herein.

As shown in FIG. 6, methods 300 include loading, at 310, the delivery item(s) into a container body (such as container body 110) of the cargo container and entering, at 320, manifest information (such as manifest information 130) regarding each delivery item into a programmable device (such as programmable device 120) of the cargo container. The entering the manifest information at 320 may be performed in any appropriate manner, such as by scanning each delivery item with an input scanner (such as input scanner 124) and/or by manually entering the manifest information via a user interface (such as user interface 126). Methods 300 additionally include operatively engaging, at 330, the cargo container with the UAV; generating, at 350, a delivery itinerary (such as delivery itinerary 30) for delivering the delivery item(s) to the respective delivery destination(s); transporting, at 360, the cargo container with the UAV along the delivery itinerary; and unloading, at 370, each delivery item at the respective delivery destination.

The engaging the cargo container with the UAV at 330 may be performed in any appropriate manner. As an example, the engaging at 330 may include engaging the cargo container with a cargo container receiver (such as cargo container receiver 212) of the UAV to transition the cargo container from an undocked configuration to a docked configuration. As another example, the engaging at 330 may include forming an electrical connection between a vehicle communication device (such as vehicle communication device 250) and a container communication device (such as container communication device 150). Additionally or alternatively, and as shown in FIG. 6, the engaging at 330 may include generating and transmitting, at 332, an engagement signal with a cargo container engagement sensor (such as cargo container engagement sensor 214) indicating that the cargo container is in the docked configuration. In such examples, the generating and transmitting at 332 may include transmitting the engagement signal to the container communication device and/or to the vehicle communication device.

As additionally shown in FIG. 6, methods 300 further may include, subsequent to the entering the manifest information at 320, transferring, at 340, delivery information (such as delivery information 140) from the cargo container to the UAV. In such examples, and as discussed herein, the delivery information is at least partially based on the manifest information. The transferring at 340 may be performed in any appropriate manner and/or between any appropriate components of the cargo aerial delivery system. For example, the transferring at 340 may include transferring the delivery information from the container communication device to the vehicle communication device. In such examples, the transferring at 340 may be performed via a wired connection and/or via a wireless connection between the container communication device and the vehicle communication device. Additionally or alternatively, in an example in which methods 300 include the generating and transmitting the engagement signal at 332, the transferring at 340 may be performed responsive to the cargo container engagement sensor indicating that the cargo container is in the docked configuration. For example, in an example in which the generating and transmitting at 332 includes transmitting the engagement signal to the container communication device, the container communication device may initiate the transferring the delivery information at 340 upon receipt of the engagement signal. Similarly, in an example in which the generating and transmitting at 332 includes transmitting the engagement signal to the vehicle communication device, the vehicle communication device may initiate the transferring the delivery information at 320 upon receipt of the engagement signal.

As discussed herein, the generating the delivery itinerary at 350 generally is at least partially based on the manifest information, and may be performed by a delivery system controller (such as delivery system controller 60). As an example, the UAV may include the delivery system controller, and the generating the delivery itinerary at 350 may be performed subsequent to the transferring the delivery information at 340. Additionally or alternatively, the generating the delivery itinerary at 350 may be performed subsequent to the generating and transmitting the engagement signal at 332.

As further shown in FIG. 6, the generating the delivery itinerary at 350 may include calculating, at 352, an optimal delivery route (such as delivery route 32 and/or such as may otherwise correspond to the delivery itinerary). The calculating the optimal delivery route at 352 may be performed in any appropriate manner and/or based on any appropriate considerations. As an example, and as shown in FIG. 6, the calculating the optimal delivery route at 352 may include calculating, at 354, a priority score associated with each delivery item such that the generating the delivery itinerary at 350 includes configuring the delivery itinerary to deliver the delivery items in order of descending priority score.

The calculating the priority scores at 354 may be based upon any appropriate considerations and/or properties of the delivery items. For example, and as discussed, it may be desirable to prioritize delivering delivery items that are relatively heavy and/or that share a delivery destination with other delivery items, such as to reduce a total weight of the delivery items carried by the UAV. Accordingly, the priority score of a given delivery item may be at least partially based upon item weight information corresponding to the given delivery item. For example, the priority score of the given delivery item may be positively correlated with the weight of the given delivery item.

Additionally or alternatively, the priority score of a given delivery item may be at least partially based upon hazardous material information corresponding to the given delivery item. For example, the priority score of the given delivery item may be positively correlated with the hazardousness of the given delivery item.

Additionally or alternatively, the priority score of a given delivery item may be at least partially based upon item destination information corresponding to the given delivery item. For example, the priority score of the given delivery item maybe negatively correlated with a distance between the UAV and the delivery destination of the given delivery item. As another example, the priority score of the given delivery item may be positively correlated with the number of other delivery items that have the same delivery destination as the given delivery item.

Additionally or alternatively, the priority score of the given delivery item may be at least partially based upon time sensitivity information corresponding to the given delivery item. For example, the priority score of the given delivery item may be negatively correlated with a time interval between a present time and a latest arrival time by which the given delivery item needs to reach the respective delivery destination.

Additionally or alternatively, the priority score of a given delivery item may be at least partially based upon item recipient information corresponding to the given delivery item. For example, the priority score of the given delivery item may be positively correlated with the number of other delivery items that have the same intended recipient as the given delivery item.

Illustrative, non-exclusive examples of inventive subject matter according to the present disclosure are described in the following enumerated paragraphs:

A1. A cargo container (100) for carrying one or more delivery items (20) to respective delivery destinations (22), the cargo container (100) comprising:

a container body (110) configured to at least partially enclose and support the one or more delivery items (20) and configured to be selectively and operatively coupled to a vehicle (200);

a programmable device (120) supported by the container body (110) that stores manifest information (130) regarding each delivery item (20) of the one or more delivery items (20); and a container communication device (150) supported by the container body (110) and configured to convey delivery information (140) to a vehicle communication device (250) of the vehicle (200) to direct the vehicle to the respective delivery destinations (22) of the one or more delivery items (20);

wherein the manifest information (130) includes item destination information that represents a delivery destination (22) of each delivery item (20) of the one or more delivery items (20); and wherein the delivery information (140) is based, at least in part, on the item destination information.

A2. The cargo container (100) of paragraph A1, wherein the delivery information (140) includes at least a portion of the manifest information (130).

A3. The cargo container (100) of any of paragraphs A1-A2, wherein the container body (110) defines a volume that has a capacity that is one or more or at least 10 liters (L), at least 50 L, at least 100 L, at least 500 L, at least 1,000 L, at least 5,000 L, at least 10,000 L, at least 50,000 L, at most 100,000 L, at most 70,000 L, at most 20,000 L, at most 7,000 L, at most 2,000 L, at most 700 L, at most 200 L, at most 70 L, or at most 20 L.

A4. The cargo container (100) of any of paragraphs A1-A3, wherein the cargo container (100) is configured to be operatively carried by any of a plurality of unique vehicles (200) that are configured to engage the cargo container (100).

A5. The cargo container (100) of any of paragraphs A1-A4, further comprising an input device (122) configured to enable selectively updating the manifest information (130) when a given delivery item (20) of the one or more delivery items (20) is added to or removed from the cargo container (100).

A6. The cargo container (100) of paragraph A5, wherein the input device (122) is configured to automatically update the manifest information (130) when the given delivery item (20) is added to or removed from the cargo container (100).

A7. The cargo container (100) of any of paragraphs A5-A6, wherein the input device (122) includes an input scanner (124) configured to scan a portion of the given delivery item (20) when the given delivery item (20) is added to or removed from the cargo container (100).

A8. The cargo container (100) of paragraph A7, wherein the input device (122) is configured to receive a manual input to update the manifest information (130).

A9. The cargo container (100) of paragraph A8, wherein the input device (122) includes a user interface (126) configured to receive an input from a human user to update the manifest information (130).

A10. The cargo container (100) of any of paragraphs A1-A9, wherein the vehicle (200) is an unmanned aerial vehicle (UAV) (200).

A11. The cargo container (100) of any of paragraphs A1-A10, further comprising a vehicle engagement structure (160) configured to selectively and operatively engage a cargo container receiver (212) of the vehicle (200) to secure the cargo container (100) to the vehicle (200) when the container body (110) is operatively coupled to the vehicle (200).

A12. The cargo container (100) of paragraph A11, wherein the vehicle engagement structure (160) is configured to mechanically engage the cargo container receiver (212) such that the cargo container (100) is at least partially restricted from moving relative to the vehicle (200) when the container body (110) is operatively coupled to the vehicle (200) and when the vehicle (200) carries the cargo container (100).

A13. The cargo container (100) of any of paragraphs A11-A12, wherein the vehicle engagement structure (160) is configured to operatively engage the cargo container receiver (212) only when the container body (110) is in a predetermined orientation relative to the vehicle (200).

A14. The cargo container (100) of any of paragraphs A11-A13, wherein one or both of the vehicle engagement structure (160) and the cargo container receiver (212) is at least partially load-bearing when the vehicle engagement structure (160) operatively engages the cargo container receiver (212).

A15. The cargo container (100) of paragraph A14, wherein the cargo container receiver (212) is configured to at least partially support a weight of the cargo container (100) when the vehicle engagement structure (160) operatively engages the cargo container receiver (212) and when the vehicle (200) carries the cargo container (100).

A16. The cargo container (100) of any of paragraphs A14-A15, wherein the vehicle engagement structure (160) is configured to at least partially support a weight of the vehicle (200) when the vehicle engagement structure (160) operatively engages the cargo container receiver (212) and when the cargo container (100) rests upon a ground surface.

A17. The cargo container (100) of paragraph A16, wherein the cargo container (100) is configured to support the vehicle (200) above the ground surface when the vehicle engagement structure (160) operatively engages the cargo container receiver (212) and when the cargo container (100) rests upon the ground surface.

A18. The cargo container (100) of any of paragraphs A1-A17, wherein the cargo container (100) includes one or more of a landing gear, a landing skid, or a ground-contacting surface configured to engage the ground surface.

A19. The cargo container (100) of any of paragraphs A1-A18, wherein one or both of the vehicle (200) and the cargo container (100) includes a cargo container engagement sensor (214) configured to detect when the container body (110) is operatively coupled to the vehicle (200).

A20. The cargo container (100) of paragraph A19, wherein the container communication device (150) is configured to convey the delivery information (140) to the vehicle communication device (250) responsive to the cargo container engagement sensor (214) indicating that the container body (110) is operatively coupled to the vehicle (200).

A21. The cargo container (100) of any of paragraphs A1-A20, wherein the container communication device (150) is configured to convey the delivery information (140) to the vehicle communication device (250) independent of communications with an external remotely located communication network.

A22. The cargo container (100) of any of paragraphs A1-A21, wherein the container communication device (150) is configured to initiate communication of the delivery information (140) to the vehicle communication device (250).

A23. The cargo container (100) of any of paragraphs A1-A22, wherein the container communication device (150) is configured to convey the delivery information (140) to the vehicle communication device (250) responsive to receiving a request for the delivery information (140) from the vehicle communication device (250).

A24. The cargo container (100) of any of paragraphs A1-A23, wherein the container communication device (150) is configured to actively transmit the delivery information (140) to the vehicle communication device (250).

A25. The cargo container (100) of any of paragraphs A1-A24, wherein the container communication device (150) is configured to form an electrical connection with the vehicle communication device (250) when the container body (110) is operatively coupled to the vehicle (200).

A26. The cargo container (100) of any of paragraphs A1-A25, wherein a/the vehicle engagement structure (160) includes the container communication device (150).

A27. The cargo container (100) of any of paragraphs A1-A26, wherein the container communication device (150) includes a wireless transmitter (152) configured to wirelessly transmit the delivery information (140) to the vehicle communication device (250).

A28. The cargo container (100) of any of paragraphs A1-A27, wherein the container communication device (150) is configured to passively provide the delivery information (140) to the vehicle communication device (250).

A29. The cargo container (100) of paragraph A28, wherein the container communication device (150) includes one or more of a barcode, a matrix barcode, a magnetic stripe, a radio frequency identification (RFID) tag, or a near-field communication (NFC) tag.

A30. The cargo container (100) of any of paragraphs A1-A29, wherein the one or more delivery items (20) include two or more delivery items (20), and wherein the delivery information (140) includes a delivery itinerary (30) that includes information regarding a delivery sequence in which the two or more delivery items (20) are to be delivered to the respective delivery destinations (22).

A31. The cargo container (100) of paragraph A30, wherein the programmable device (120) is configured to generate the delivery itinerary (30) based, at least in part, upon the manifest information (130).

A32. The cargo container (100) of any of paragraphs A30-A31, wherein the programmable device (120) is configured to generate the delivery itinerary (30) responsive to a/the cargo container engagement sensor (214) indicating that a/the vehicle engagement structure (160) operatively engages a/the cargo container receiver (212).

A33. The cargo container (100) of any of paragraphs A30-A32, wherein the programmable device (120) is configured to convey the delivery itinerary (30) to the vehicle (200) responsive to a/the cargo container engagement sensor (214) indicating that a/the vehicle engagement structure (160) operatively engages a/the cargo container receiver (212).

A34. The cargo container (100) of any of paragraphs A30-A33, wherein the delivery itinerary (30) is based, at least in part, on the item destination information.

A35. The cargo container (100) of paragraph A34, wherein the delivery sequence is arranged at least in part to prioritize delivering the two or more delivery items (20) in order of increasing distance from the vehicle (200).

A36. The cargo container (100) of any of paragraphs A34-A35, wherein the delivery sequence is arranged such that delivery of a given delivery item (20) of the two or more delivery items (20) is at least partially prioritized when the given delivery item (20) has the same delivery destination (22) as one or more other delivery items (20) of the two or more delivery items (20).

A37. The cargo container (100) of any of paragraphs A30-A36, wherein the manifest information (130) includes item weight information that represents a weight of each of the two or more delivery items (20), and wherein the delivery itinerary (30) is based, at least in part, on the item weight information.

A38. The cargo container (100) of paragraph A37, wherein the delivery sequence is arranged at least in part to prioritize delivering the two or more delivery items (20) in order of decreasing weight of the two or more delivery items (20) for each respective delivery destination (22).

A39. The cargo container (100) of any of paragraphs A30-A38, wherein the manifest information (130) further includes item recipient information that represents an intended recipient of each of the two or more delivery items (20).

A40. The cargo container (100) of paragraph A39, wherein the delivery sequence is arranged such that delivery of a given delivery item (20) of the two or more delivery items (20) is at least partially prioritized when the given delivery item (20) has the same intended recipient as one or more other delivery items (20) of the two or more delivery items (20).

A41. The cargo container (100) of any of paragraphs A30-A40, wherein the manifest information (130) further includes hazardous material information that represents a hazardousness associated with each of the two or more delivery items (20).

A42. The cargo container (100) of paragraph A41, wherein the delivery sequence is arranged at least in part to prioritize delivering the two or more delivery items (20) in order of decreasing hazardousness.

A43. The cargo container (100) of any of paragraphs A30-A42, wherein the manifest information (130) further includes time sensitivity information that represents a latest arrival time by which each of the two or more delivery items (20) needs to reach the respective delivery destinations (22).

A44. The cargo container (100) of paragraph A43, wherein the delivery sequence is arranged at least in part to prioritize delivering the two or more delivery items (20) in order of increasing latest arrival times.

B1. A cargo aerial delivery system (10) for delivering one or more delivery items (20) to one or more delivery destinations (22), the cargo aerial delivery system (10) comprising:
- a cargo container (100) configured to carry the one or more delivery items (20); and
- an unmanned aerial vehicle (UAV) (200) configured to carry the cargo container (100) to each of one or more delivery destinations (22) corresponding to the one or more delivery items (20);
- wherein the cargo container (100) includes a programmable device (120) that stores manifest information (130) regarding each delivery item (20) of the one or more delivery items (20); wherein the manifest information (130) includes item destination information that represents the respective delivery destination (22) of each delivery item (20) of the one or more delivery items (20); wherein the cargo aerial delivery system (10) further utilizes a local communication mode (50) configured to convey delivery information (140) from the cargo container (100) to the UAV (200), and wherein the delivery information (140) is based, at least in part, on the item destination information.

B2. The cargo aerial delivery system (10) of paragraph B1, wherein the cargo container (100) is the cargo container (100) of any of paragraphs A1-A44.

B3. The cargo aerial delivery system (10) of any of paragraphs B1-B2, wherein the cargo container (100) is configured to be carried by any of a plurality of unique UAVs (200) that are configured to engage the cargo container (100).

B4. The cargo aerial delivery system (10) of any of paragraphs B1-B3, wherein the manifest information (130) further includes a/the item weight information that represents a/the weight of each delivery item (20) of the one or more delivery items (20).

B5. The cargo aerial delivery system (10) of any of paragraphs B1-B4, wherein the manifest information (130) further includes a/the item identification information that represents an/the identity of each delivery item (20) of the one or more delivery items (20).

B6. The cargo aerial delivery system (10) of any of paragraphs B1-B5, wherein the manifest information (130) further includes a/the item recipient information that represents an/the intended recipient of each delivery item (20) of the one or more delivery items (20).

B7. The cargo aerial delivery system (10) of any of paragraphs B1-B6, wherein the manifest information (130) further includes a/the hazardous material information that represents a/the hazardousness associated with each delivery item (20) of the one or more delivery items (20).

B8. The cargo aerial delivery system (10) of paragraph B7, wherein the hazardous material information corresponds to a safety data sheet (SDS) associated with each delivery item (20) of the one or more delivery items (20).

B9. The cargo aerial delivery system (10) of any of paragraphs B1-B8, wherein the manifest information (130) further includes a/the time sensitivity information that represents a/the latest arrival time by which each delivery item (20) of the one or more delivery items (20) needs to reach the respective delivery destination (22).

B10. The cargo aerial delivery system (10) of any of paragraphs B1-B9, wherein the UAV (200) includes a docking bay (210), and wherein the cargo container (100) is at least partially received within the docking bay (210) when the cargo container (100) is operatively coupled to the UAV (200).

B11. The cargo aerial delivery system (10) of any of paragraphs B1-610, wherein the cargo container (100) and the one or more delivery items (20) collectively have a total mass that is one or more of at least 1 kilogram (kg), at least 5 kg, at least 10 kg, at least 50 kg, at least 100 kg, at least 500 kg, at least 1,000 kg, at most 1,500 kg, at most 700 kg, at most 200 kg, at most 70 kg, at most 20 kg, at most 7 kg, or at most 2 kg.

B12. The cargo aerial delivery system (10) of any of paragraphs B1-B11, wherein the UAV (200) is a rotorcraft with one or more rotors (230).

B13. The cargo aerial delivery system (10) of paragraph B12, wherein the one or more rotors (230) includes one rotor (230), two rotors (230), three rotors (230), four rotors (230), or more than four rotors (230).

B14. The cargo aerial delivery system (10) of any of paragraphs B12-B13, wherein the one or more rotors (230) are at least partially battery-powered.

B15. The cargo aerial delivery system (10) of any of paragraphs B1-B14, wherein the local communication mode (50) is utilized to convey the delivery information (140) from the cargo container (100) directly to the UAV (200).

B16. The cargo aerial delivery system (10) of any of paragraphs B1-B15, wherein the local communication mode (50) is utilizes to convey the delivery information (140) from the cargo container (100) to the UAV (200) independent of communications with an external remotely-located communication network.

B17. The cargo aerial delivery system (10) of any of paragraphs B1-B16, wherein the UAV (200) includes a vehicle communication device (250), wherein the cargo container (100) includes a container communication device (150), and wherein the local communication mode (50) is utilized by the vehicle communication device (250) and the container communication device (150).

B18. The cargo aerial delivery system (10) of paragraph B17, wherein the local communication mode (50) is utilized to convey the delivery information (140) from the container communication device (150) to the vehicle communication device (250) via one or more of near-field communication, Bluetooth communication, radio frequency (RF) communication, a code scanner, a bar code scanner, an electromagnetic signal, an electrical signal, an optical signal, an RF signal, a near-field communication signal, a wireless connection, a wired connection, a direct connection, or a visual connection.

B19. The cargo aerial delivery system (10) of any of paragraphs B1-B18, further comprising a delivery system controller (60) configured to generate a/the delivery itinerary (30) for the UAV (200) to travel along to deliver the one or more delivery items (20), wherein the delivery itinerary (30) is based, at least in part, on the manifest information (130).

B20. The cargo aerial delivery system (10) of paragraph B19, wherein the delivery information (140) includes, and optionally is, the delivery itinerary (30).

B21. The cargo aerial delivery system (10) of any of paragraphs B19-B20, wherein the UAV (200) includes the delivery system controller (60).

B22. The cargo aerial delivery system (10) of any of paragraphs B19-B21, wherein the cargo container (100) includes the delivery system controller (60).

B23. The cargo aerial delivery system (10) of paragraph B22, wherein the programmable device (120) includes the delivery system controller (60).

B24. The cargo aerial delivery system (10) of any of paragraphs B19-B23, wherein the delivery system controller (60) is configured to generate the delivery itinerary (30) based, at least in part, on a/the item weight information regarding each delivery item (20) of the one or more delivery items (20) for each delivery destination (22).

B25. The cargo aerial delivery system (10) of paragraph B24, wherein the one or more delivery items (20) include two or more delivery items (20), and wherein the delivery system controller (60) is configured to generate the delivery itinerary (30) such that the two or more delivery items (20) are delivered to the respective delivery destinations (22) at least partially in order of descending weight of the two or more delivery items (20) for each delivery destination (22).

B26. The cargo aerial delivery system (10) of any of paragraphs B9-B25, wherein the delivery system controller (60) is configured to generate the delivery itinerary (30) based, at least in part, on a/the hazardous material information regarding each delivery item (20) of the one or more delivery items (20).

B27. The cargo aerial delivery system (10) of paragraph B26, wherein the one or more delivery items (20) includes two or more delivery items (20), and wherein the delivery system controller (60) is configured to generate the delivery itinerary (30) such that the two or more delivery items (20)

are delivered to the respective delivery destinations (22) at least partially in order of decreasing hazardousness of the two or more delivery items (20).

B28. The cargo aerial delivery system (10) of any of paragraphs B19-B27, wherein the delivery system controller (60) is configured to generate the delivery itinerary (30) based, at least in part, on a/the time sensitivity information regarding each delivery item (20) of the one or more delivery items (20).

B29. The cargo aerial delivery system (10) of paragraph B28, wherein the one or more delivery items (20) includes two or more delivery items (20), and wherein the delivery system controller (60) is configured to generate the delivery itinerary (30) such that the two or more delivery items (20) are delivered to the respective delivery destinations (22) at least partially in order of descending time sensitivity of the two or more delivery items (20).

B30. The cargo aerial delivery system (10) of any of paragraphs B1-B29, wherein the UAV (200) includes a/the cargo container receiver (212) configured to selectively and operatively engage the cargo container (100) such that the cargo container (100) is secured to the UAV (200) and such that the UAV (200) may carry the cargo container (100).

B31. The cargo aerial delivery system (10) of paragraph B30, wherein the cargo container (100) includes a/the vehicle engagement structure (160) configured to selectively and operatively engage the cargo container receiver (212) to operatively secure the cargo container (100) to the UAV (200).

B32. The cargo aerial delivery system (10) of paragraph B31, wherein one or both of the vehicle engagement structure (160) and the cargo container receiver (212) is at least partially load-bearing when the vehicle engagement structure (160) operatively engages the cargo container receiver (212).

B33. The cargo container (100) of paragraph B32, wherein the cargo container receiver (212) is configured to at least partially support a weight of the cargo container (100) when the vehicle engagement structure (160) operatively engages the cargo container receiver (212) and when the vehicle (200) carries the cargo container (100).

B34. The cargo container (100) of any of paragraphs B32-B33, wherein the vehicle engagement structure (160) is configured to at least partially support a weight of the vehicle (200) when the vehicle engagement structure (160) operatively engages the cargo container receiver (212) and when the cargo container (100) rests upon a ground surface.

B35. The cargo container (100) of paragraph B34, wherein the cargo container (100) is configured to support the vehicle (200) above the ground surface when the vehicle engagement structure (160) operatively engages the cargo container receiver (212) and when the cargo container (100) rests upon the ground surface.

B36. The cargo aerial delivery system (10) of any of paragraphs B30-B35, wherein the cargo container (100) is configured to be selectively transitioned between a docked configuration, in which the cargo container receiver (212) operatively engages the cargo container (100) such that the UAV (200) may carry the cargo container (100), and an undocked configuration, in which the cargo container (100) is removed from the UAV (200).

B37. The cargo aerial delivery system (10) of paragraph B36, wherein the cargo container receiver (212) is configured to at least partially restrict the cargo container (100) from transitioning from the docked configuration to the undocked configuration.

B38. The cargo aerial delivery system (10) of any of paragraphs B36-B37, wherein the vehicle engagement structure (160) is configured to at least partially restrict the cargo container (100) from transitioning from the docked configuration to the undocked configuration. B39. The cargo aerial delivery system (10) of any of paragraphs B36-B38, when dependent from paragraph B31, wherein the cargo container (100) is restricted from transitioning from the undocked configuration to the docked configuration unless the vehicle engagement structure (160) and the cargo container receiver (212) are in a predetermined orientation relative to one another.

B40. The cargo aerial delivery system (10) of any of paragraphs B36-B39, further comprising a/the cargo container engagement sensor (214) configured to detect when the cargo container (100) is in the docked configuration.

B41. The cargo aerial delivery system (10) of paragraph B40, wherein one or both of the cargo container receiver (212) and the vehicle engagement structure (160) includes the cargo container engagement sensor (214).

B42. The cargo aerial delivery system (10) of any of paragraphs B40-B41, wherein the local communication mode (50) is utilized to initiate transfer of the delivery information (140) from the container communication device (150) to the vehicle communication device (250) responsive to the cargo container engagement sensor (214) indicating that the cargo container (100) is in the docked configuration.

B43. The cargo aerial delivery system (10) of any of paragraphs B1-B42, further comprising a ground-based control system (12) configured to monitor the UAV (200), and wherein the UAV (200) includes a ground communication device (220) configured to communicate with the ground-based control system (12).

B44. The cargo aerial delivery system (10) of paragraph B43, wherein the ground-based control system (12) is configured to monitor, via communication with the ground communication device (220), a location of the UAV (200).

B45. The cargo aerial delivery system (10) of any of paragraphs B43-B44, wherein the ground-based control system (12) is configured to monitor, via communication with the ground communication device (220), a delivery status of the one or more delivery items (20) carried by the UAV (200).

B46. The use of the cargo aerial delivery system (10) of any of paragraphs B1-B45 to deliver one or more delivery items (20) to one or more delivery destinations (22).

C1. A method (300) of utilizing a cargo aerial delivery system (10) that includes a cargo container (100) and an unmanned aerial vehicle (UAV) (200) to deliver one or more delivery items (20) to respective delivery destinations (22), the method comprising:
  loading (310) the one or more delivery items (20) into a container body (110) of the cargo container (100);
  entering (320) the manifest information (130) regarding each delivery item (20) of the one or more delivery items (20) into a programmable device (120) of the cargo container (100);
  operatively engaging (330) the cargo container (100) with the UAV (200);
  generating (350) a delivery itinerary (30) for delivering each of the one or more delivery items (20) to the respective delivery destinations (22);
  transporting (360) the cargo container (100) with the UAV (200) according to the delivery itinerary (30); and
  unloading (370) each of the one or more delivery items (20) at the respective delivery destinations (22).

C2. The method (300) of paragraph C1, wherein the cargo aerial delivery system (10) is the cargo aerial delivery system (10) of any of paragraphs B1-B46.

C3. The method (300) of any of paragraphs C1-C2, wherein the entering (320) the manifest information (130) into the programmable device (120) includes scanning each of the one or more delivery items (20) with an input scanner (124).

C4. The method (300) of any of paragraphs C1-C3, wherein the entering (320) the manifest information (130) into the programmable device (120) includes manually entering the manifest information (130) via a/the user interface (126).

C5. The method (300) of any of paragraphs C1-C4, wherein the engaging (330) the cargo container (100) with the UAV (200) includes engaging the cargo container (100) with a/the cargo container receiver (212) to transition the cargo container (100) from a/the undocked configuration to a/the docked configuration.

C6. The method (300) of paragraph C5, wherein the engaging the cargo container (100) with the cargo container receiver (212) includes forming an electrical connection between a/the vehicle communication device (250) and a/the container communication device (150).

C7. The method (300) of any of paragraphs C5-C6, wherein the engaging the cargo container (100) with the cargo container receiver (212) includes generating and transmitting (332) an engagement signal with a/the cargo container engagement sensor (214) indicating that the cargo container (100) is in the docked configuration.

C8. The method (300) of paragraph C7, wherein the generating and transmitting (332) the engagement signal includes transmitting the engagement signal to a/the container communication device (150).

C9. The method (300) of any of paragraphs C7-C8, wherein the generating and transmitting (332) the engagement signal includes transmitting the engagement signal to a/the vehicle communication device (250).

C10. The method (300) of any of paragraphs C1-C9, further comprising, subsequent to the entering (320) the manifest information (130), transferring (340) delivery information (140) from the cargo container (100) to the UAV (200), wherein the delivery information (140) is based, at least in part, on the manifest information (130).

C11. The method (300) of paragraph C10, wherein the transferring (340) the delivery information (140) includes transferring the delivery information (140) from a/the container communication device (150) to a/the vehicle communication device (250).

C12. The method (300) of paragraph C11, wherein the transferring (340) the delivery information (140) is performed via a wired connection between the container communication device (150) and the vehicle communication device (250).

C13. The method (300) of any of paragraphs C11-C12, wherein the transferring (340) the delivery information (140) is performed via a wireless connection between the container communication device (150) and the vehicle communication device (250).

C14. The method (300) of any of paragraphs C10-C13, when dependent from paragraph C7, wherein the transferring (340) the delivery information (140) is performed responsive to the cargo container engagement sensor (214) indicating that the cargo container (100) is in the docked configuration.

C15. The method (300) of paragraph C14, wherein the generating and transmitting (332) the engagement signal with the cargo container engagement sensor (214) includes transmitting the engagement signal to the container communication device (150), and wherein the container communication device (150) initiates the transferring (340) the delivery information (140) from the cargo container (100) to the UAV (200) upon receipt of the engagement signal.

C16. The method (300) of any of paragraphs C14-C15, wherein the generating and transmitting (332) the engagement signal with the cargo container engagement sensor (214) includes transmitting the engagement signal to the vehicle communication device (250), and wherein the vehicle communication device (250) initiates the transferring (340) the delivery information (140) from the cargo container (100) to the UAV (200) upon receipt of the engagement signal.

C17. The method (300) of any of paragraphs C1-C16, wherein the generating (350) the delivery itinerary (30) is performed by a/the delivery system controller (60).

C18. The method (300) of paragraph C17, wherein the UAV (200) includes the delivery system controller (60), and wherein the generating (350) the delivery itinerary (30) is performed subsequent to the transferring (340) the delivery information (140) from the cargo container (100) to the UAV (200).

C19. The method (300) of any of paragraphs C1-C18, wherein the generating (350) the delivery itinerary (30) is performed subsequent to a/the cargo container engagement sensor (214) generating and transmitting (332) a/the engagement signal.

C20. The method (300) of any of paragraphs C1-C19, wherein the generating (350) the delivery itinerary (30) includes calculating (352) an optimal delivery route (32).

C21. The method (300) of paragraph C20, wherein the one or more delivery items (20) include two or more delivery items (20), wherein the calculating (352) the optimal delivery route (32) includes calculating (354) a priority score associated with each of the two or more delivery items (20), and wherein the generating (350) the delivery itinerary (30) includes configuring the delivery itinerary (30) to deliver the two or more delivery items (20) in order of descending priority score.

C22. The method (300) of paragraph C21, wherein the priority score of a given delivery item (20) of the two or more delivery items (20) is at least partially based upon a/the item weight information corresponding to the given delivery item (20).

C23. The method (300) of paragraph C22, wherein the priority score of the given delivery item (20) is positively correlated with a/the weight of the given delivery item (20).

C24. The method (300) of any of paragraphs C21-C23, wherein the priority score of a given delivery item (20) of the two or more delivery items (20) is at least partially based upon a/the hazardous material information corresponding to the given delivery item (20).

C25. The method (300) of paragraph C24, wherein the priority score of the given delivery item (20) is positively correlated with a/the hazardousness of the given delivery item (20).

C26. The method (300) of any of paragraphs C21-C25, wherein the priority score of a given delivery item (20) of the two or more delivery items (20) is at least partially based upon a/the item destination information corresponding to the given delivery item (20).

C27. The method (300) of paragraph C26, wherein the priority score of the given delivery item (20) is negatively correlated with a distance between the UAV (200) and the delivery destination (22) of the given delivery item (20).

C28. The method (300) of any of paragraphs C26-C27, wherein the priority score of the given delivery item (20) is positively correlated with the number of other delivery items (20) that have the same delivery destination (22) as the given delivery item (20).

C29. The method (300) of any of paragraphs C21-C28, wherein the priority score of a given delivery item (20) of the two or more delivery items (20) is at least partially based upon a/the time sensitivity information corresponding to the given delivery item (20).

C30. The method (300) of paragraph C29, wherein the priority score of the given delivery item (20) is negatively correlated with a time interval between a present time and a/the latest arrival time by which the given delivery item (20) needs to reach the respective delivery destination (22).

C31. The method (300) of any of paragraphs C21-C30, wherein the priority score of a given delivery item (20) of the two or more delivery items (20) is at least partially based upon a/the item recipient information corresponding to the given delivery item (20).

C32. The method (300) of paragraph C31, wherein the priority score of the given delivery item (20) is positively correlated with the number of other delivery items (20) that have the same intended recipient as the given delivery item (20).

As used herein, the phrase "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, a first direction that is at least substantially parallel to a second direction includes a first direction that is within an angular deviation of 22.5° relative to the second direction and also includes a first direction that is identical to the second direction.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/ or methods, are also within the scope of the present disclosure.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order, concurrently, and/or repeatedly. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

The various disclosed elements of apparatuses and systems and steps of methods disclosed herein are not required to all apparatuses, systems, and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus, system, or method. Accordingly, such inventive subject matter is not required to be associated with the specific apparatuses, systems, and methods that are expressly disclosed herein and such inventive subject matter may find utility in apparatuses, systems, and/or methods that are not expressly disclosed herein.

The invention claimed is:

1. A cargo container for carrying two or more delivery items to respective delivery destinations, the cargo container comprising:
   a cargo container body configured to at least partially enclose and support the two or more delivery items and configured to be selectively and operatively coupled to an unmanned aerial vehicle;
   a programmable device supported by the cargo container body that stores manifest information regarding each of the two or more delivery items; and
   a container communication device supported by the cargo container body and configured to convey a delivery itinerary to a vehicle communication device of the unmanned aerial vehicle to direct the unmanned aerial vehicle to the respective delivery destinations of the two or more delivery items;
   wherein the manifest information includes a respective delivery destination of each of the two or more delivery items;
   wherein the programmable device is configured to generate the delivery itinerary, independent of communications with an external remotely located communication network, utilizing the manifest information and the respective delivery destination of each of the two or more delivery items comprised in the manifest information, wherein the delivery itinerary includes instructions corresponding to a delivery route for the unmanned aerial vehicle to travel along to deliver the two or more delivery items to the respective delivery destinations and a delivery sequence in which the two or more delivery items are to be delivered to the respective delivery destinations; and
   wherein the container communication device is configured to convey the delivery itinerary, including the instructions corresponding to the delivery route and the delivery sequence in which the two or more delivery items are to be delivered to the respective delivery destinations, from the programmable device to the vehicle communication device independent of communications with the external remotely located communication network, such that the unmanned aerial vehicle is configured to receive the delivery itinerary directly from the container communication device independent of communications with the external remotely located communication network.

2. The cargo container of claim 1, wherein the manifest information includes item weight information that represents a weight of each of the two or more delivery items; wherein the delivery itinerary is based, at least in part, on the item weight information; and wherein the delivery sequence is arranged at least in part to prioritize delivering the two or more delivery items in order of decreasing weight of the two or more delivery items for each respective delivery destination.

3. The cargo container of claim 1, wherein the delivery sequence is arranged at least in part to prioritize delivering the two or more delivery items in order of increasing distance from an initial position of the unmanned aerial vehicle.

4. The cargo container of claim 1, wherein the delivery sequence is arranged such that delivery of a given delivery item of the two or more delivery items is at least partially prioritized when the given delivery item has the same respective delivery destination as one or more other delivery items of the two or more delivery items.

5. The cargo container of claim 1, wherein the delivery itinerary includes at least a portion of the manifest information.

6. The cargo container of claim 1, wherein one or both of the unmanned aerial vehicle and the cargo container includes a cargo container engagement sensor configured to detect when the cargo container body is operatively coupled to the unmanned aerial vehicle, and wherein the container communication device is configured to convey the delivery itinerary to the vehicle communication device responsive to the cargo container engagement sensor indicating that the cargo container body is operatively coupled to the unmanned aerial vehicle.

7. The cargo container of claim 1, wherein the container communication device is configured to convey the delivery itinerary to the vehicle communication device responsive to receiving a request for the delivery itinerary from the vehicle communication device.

8. The cargo container of claim 1, wherein the container communication device is configured to form an electrical connection with the vehicle communication device when the cargo container body is operatively coupled to the unmanned aerial vehicle.

9. The cargo container of claim 1, wherein the container communication device includes a wireless transmitter configured to wirelessly transmit the delivery itinerary to the vehicle communication device.

10. The cargo container of claim 1, wherein the container communication device includes one or more of a barcode, a matrix barcode, a magnetic stripe, a radio frequency identification (RFID) tag, or a near-field communication (NFC) tag.

11. The cargo container of claim 1, further comprising an input device configured to enable selectively updating the manifest information when a given delivery item of the two or more delivery items is added to or removed from the cargo container.

12. The cargo container of claim 11, wherein the input device is configured to automatically update the manifest information when the given delivery item is added to or removed from the cargo container.

13. The cargo container of claim 11, wherein the input device includes an input scanner configured to scan a portion of the given delivery item when the given delivery item is added to or removed from the cargo container.

14. The cargo container of claim 11, wherein the input device is configured to receive a manual input to update the manifest information, and wherein the input device includes a user interface configured to receive an input from a human user to update the manifest information.

15. The cargo container of claim 1, further comprising a vehicle engagement structure configured to operatively engage a cargo container receiver of the unmanned aerial vehicle to secure the cargo container to the unmanned aerial vehicle when the cargo container body is operatively coupled to the unmanned aerial vehicle.

16. The cargo container of claim 15, wherein the vehicle engagement structure is configured to operatively engage the cargo container receiver only when the cargo container body is in a predetermined orientation relative to the unmanned aerial vehicle.

17. The cargo container of claim 1, wherein the cargo container body defines a volume that has a capacity that is at least 500 liters.

18. The cargo container of claim 1, wherein the container communication device is configured to initiate communication of the delivery itinerary to the vehicle communication device.

19. The cargo container of claim 1, wherein the cargo container is configured to be operatively carried by any of a plurality of unique vehicles that are configured to engage the cargo container.

20. The cargo container of claim 1, wherein the container communication device is configured to actively transmit the delivery itinerary to the vehicle communication device.

* * * * *